April 29, 1958     M. W. LEE, SR., ET AL     2,832,409
TIME AND MANUALLY CONTROLLED VALVE
Filed Jan. 30, 1957
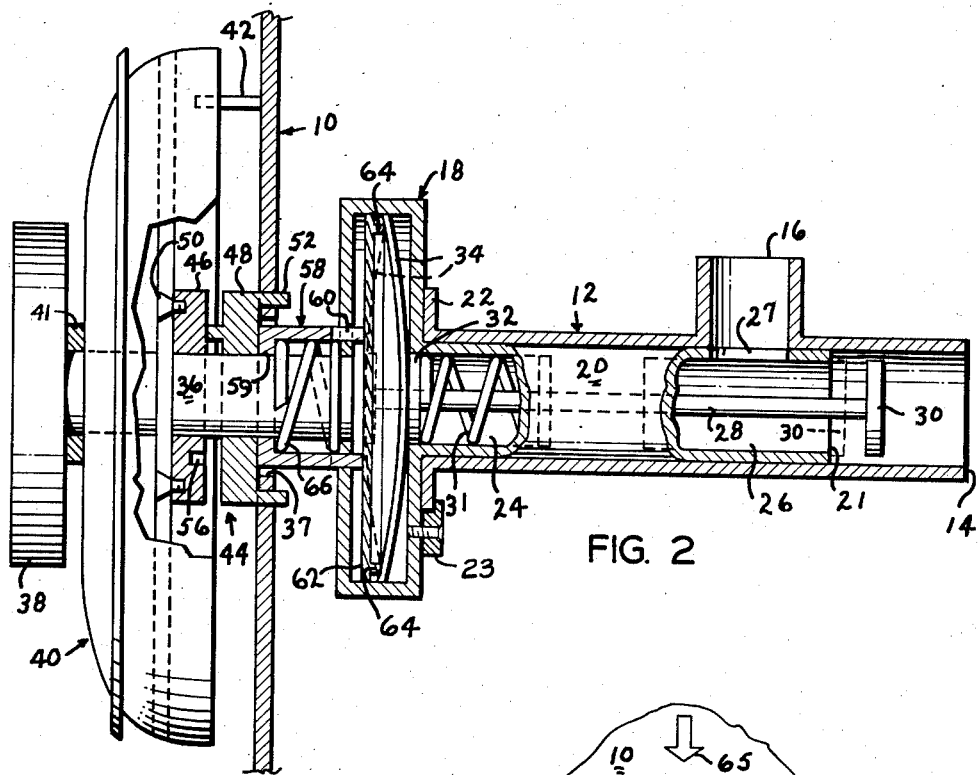
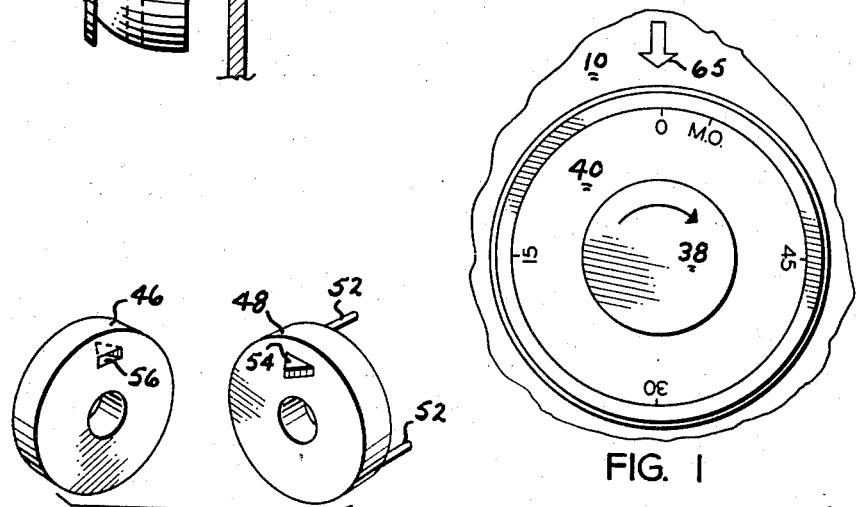
FIG. 3
Maurice W. Lee, Sr.,
Maurice W. Lee, Jr.,
INVENTORS
BY Loya J. Miller
ATTORNEY United States Patent Office 2,832,409
Patented Apr. 29, 1958

2,832,409

TIME AND MANUALLY CONTROLLED VALVE

Maurice W. Lee, Sr., and Maurice W. Lee, Jr., Boley, Okla.

Application January 30, 1957, Serial No. 637,246

6 Claims. (Cl. 161—9)

The present invention relates to valves, and more particularly, but not by way of limitation, to a time and manually controlled valve for regulating the supply of fuel to a burner.

The principal object of the present invention is to provide a time controlled valve for interrupting the flow of fuel to a burner as used on cook stoves or the like.

A similarly important object of this invention is to provide a valve of this class which may be manually operated in a conventional manner without actuating the timing mechanism.

Another object of the present invention is to provide a valve of this class which may be manually set and which operates entirely by mechanical means to automatically interrupt the flow of fuel at a predetermined time.

An additional object is to provide a valve of this character which may be easily used on top burners of cook stoves, or the like, as well as being adaptable for use in connection with thermostatically controlled oven burners, heaters, or the like.

A further object is to provide a device which has timing means associated therewith which operates to instantaneously interrupt the flow of fuel by a snap-action valve.

Still another object is to provide a time controlled valve which is simple and efficient in operation and which may be inexpensively constructed, and not easily gotten out of order.

The present invention accomplishes these and other objects by providing an elongated tubular member having a fuel inlet end and an outlet port fixedly secured to a supply of fuel. A cylindrical hollow housing having a centrally bored shaft axially secured to one end thereof is rotatably secured to the end of the tubular member opposite its inlet end with the shaft of the housing axially disposed rotatably within the bore of the tubular member. The shaft is counter-bored adjacent each of its ends with the counter-bored end adjacent the housing communicating with the interior thereof. The counter-bored end of the shaft opposite the housing forms a valve seat and has an aperture in its wall movable into and out of registration with the outlet port in the tubular member for forming a fuel passageway. A valve stem is slidably carried by the bore of the shaft and has a valve and valve head secured to its opposite ends. Spring means carried by the counter-bore adjacent the housing normally urges the valve toward a seated position. A diaphragm disk axially carried by the housing may be flexed between two extreme positions for contacting the valve head and opening and closing the valve. A control member is axially secured to the end of the housing opposite the shaft, whereby the shaft may be manually rotated to open or close the passageway. Timing means carried by the control member has cam means secured thereto for moving sleeve means carried by the control member to contact the diaphragm disk and flex the same to valve opening position.

Other objects will be apparent from the following description when taken in conjunction with the accompanying single sheet of drawings, wherein:

Figure 1 is a front elevational view of the device, and a fragment of a supporting panel;

Figure 2 is a horizontal cross sectional view, partly in elevation, of the device in operating position; and, Figure 3 is an exploded perspective view of the cam operating means on a reduced scale.

Like characters of reference designate like parts in those figures of the drawings in which they occur.

In the drawings:

The reference numeral 10 indicates, as a whole, the vertically disposed front panel of a cooking stove, or the like. The reference numeral 12 indicates an elongated tubular member horizontally disposed in spaced-apart perpendicular relation with respect to the panel 10. One end 14 of the tubular member is rigidly connected to a supply of fuel, such as gas or the like. A lateral extension on the tubular member forms an outlet port 16 adjacent but spaced from the inlet end 14 and has the free end thereof secured in a conventional manner to a gas burner, not shown. A hollow housing 18, right circular cylindrical in general configuration and having a centrally bored elongated shaft 20 rigidly connected axially to one end thereof, is axially secured in rotatable relation to an annular flange 22 provided on the end of the tubular member opposite the inlet end 14. Flanged lugs 23, carried by the housing 18 adjacent the flange 22, overlap the latter and prevent longitudinal movement of the shaft 20 relative to the member 12. The periphery of the shaft 20 is closely received for rotation by the bore of the tubular member 12. The length of the shaft 20 is such that the inwardly disposed end 21 extends beyond the opening of the outlet port 16 toward the inlet end 14. The opposing ends of the shaft 20 are provided with enlarged counter-bores 24 and 26, respectively. The counter-bore 24 is in communication with the interior of the housing 18. The wall of the shaft defined by the counter-bore 26 is provided with an aperture 27 angularly rotatable into and out of registration with the outlet port 16, thus forming, in co-operation with the tubular member 12, a fuel passageway. The end 21 of the shaft is ground to provide a smooth surface, thus forming a valve seat for the purposes which will presently be apparent.

A valve stem 28, having a length slightly greater than the length of the shaft 20, is slidably carried by the bore thereof. A valve 30, diametrically slightly larger than the diameter of the counter-bore 26, is axially secured to the end valve stem 28 adjacent the valve seat 21 for opening and closing the passageway. A valve head 32, substantially equal diametrically with relation to the counter-bore 24, is axially secured to the end of the valve stem 28 opposite the valve 30. A helical spring 31 is axially interposed around the valve stem 28 between the valve head 32 and the bottom of the counter-bore 24 for normally urging the valve 30 to a seated position.

A concavo-convex snap-action disk 34, illustrated in exaggerated thickness for clarity, is axially disposed within the housing 18 with the periphery of the disk secured in contiguous contact with the inner peripherial wall of the housing, so that the disk 34 may be flexed between its normally disposed position, as shown by the dotted line in Fig. 2, to the position shown by solid lines and, when in the solid line position, centrally contacts the valve head 32 to move the valve stem 28 and unseat the valve 30, in a manner more fully disclosed hereinbelow.

A rod or control member 36, substantially cylindrical in general configuration, is axially connected at one end to the end o fthe housing 18 opposite the shaft 28 and projects outwardly or forwardly of the stove front panel 10 through an opening 37 therein. A knob or dial 38 is axially connected to the free end of the control member 36 for manually rotating the same and the shaft 20 for mating or mis-mating the aperture 27 with the outlet port 16, thereby regulating the amount of fuel flowing through the passageway to the burner when the valve 30 is open.

A timing mechanism 40, circular in general configuration, is disposed around the control member 36 between the control knob 38 and the panel 10. A spacer 41 is interposed between the knob 38 and the timer housing 40. The timing mechanism 40 may be of any desired construction or type and, in the example shown by the drawings, comprises a spring wound clock type having the spring thereof, not shown, connected to a pin 42 attached to the adjacent side of the panel 10, so that the body of the timing mechanism 40 may be manually rotated clockwise, as shown by the direction arrow in Fig. 1, thus winding the timing spring. Timing escapement means, not shown, but which is conventional with spring wound clock mechanisms, controls the rate at which the timing mechanism turns back toward stopped position. The purpose of the timing mechanism 40 is to release the diaphragm 34 from the position shown by solid lines in Fig. 2, and close the valve 30 at a predetermined time, as will presently be apparent.

Cam means 44 is interposed between the timing mechanism 40 and the panel 10. The cam means includes two substantially cylindrical or disk-like sections 46 and 48. The cam 46 is centrally bored and is flatly secured by screws 50 to the inwardly disposed side of the timing mechanism 40 around the control member 36 with the axis of the cam substantially normal to the axis of the control member. Thus, the cam 46 rotates with the timing mechanism 40. The cam section 48 is similar in construction with relation to the cam 46 and is flatly interposed between the cam 46 and the panel 10. The cam 48 further includes a plurality of prongs or pins 52 which project through co-operating perforations in the panel 10, thus securing the cam 48 against rotation but permitting longitudinal movement of the cam 48 relative to the control member 36. The cam 48 is provided with a lug or extension 54, triangular in configuration, as illustrated in Fig. 3, which projects toward the adjacent end of the cam 46 where it is received within a co-operatingly disposed recess 56 provided within the surface of the cam 46, for the purposes more fully disclosed hereinbelow.

Sleeve means 58, axially surrounding the control member 36, is interposed between the cam 48 and the adjacent end of the housing 18. One end of the sleeve is provided with an inwardly extending flange forming a shoulder 59 which contacts the adjacent end of the cam 48 through the opening 37 in the panel 10. The opposite end of the sleeve 58 is provided with a plurality of legs or prongs 60, similar to the prongs 52 on the cam 48, which extend through the adjacent wall of the housing 18 through cooperatively disposed perforations. The inwardly disposed ends of the legs 60 contact a substantially flat disk 62 axially carried by the housing 18 adjacent the diaphragm 34. The periphery of the disk 62 is freely received by the inner wall of the housing 18, thus permitting axial longitudinal movement of the disk within the housing. The disk 62 is provided with an annular ring 64 adjacent its periphery which projects toward and contacts the diaphragm 34 adjacent its periphery. A helical spring 66 is carried by the bore of the sleeve between the sleeve shoulder 59 and the adjacent surface of the housing 18 around the control member 36 for holding the sleeve against the cam 48 and normally urging the cam 48 into contact with the cam 46.

Operation

When the timing mechanism 40 is not actuated the zero of its indicial markings is aligned with the arrow 65 scribed on the panel 10. In this position the cam lug 54 is nested by the recess 56, allowing the diaphragm 34 to assume its normal position, as shown by dotted lines, with the valve 30 seated against the shaft end 21 by the action of the spring means 31, thus closing the fuel passageway. The timing mechanism 40 is actuated by rotating the same clockwise to align the desired minute markings thereon with the arrow 65. This removes the lug 54 from within the recess 56 and separates the cam sections 46 and 48, forcing the sleeve 58 longitudinally of the control member 36 for contacting the sleeve prongs 60 with the disk 62 which in turn applies pressure centrally to the diaphragm 34 and snaps the same toward the position shown in solid lines (Fig. 2). The diaphragm 34, centrally contacting the valve head 32, moves the valve stem 28 and unseats the valve 30 to open the fuel passageway. The diaphragm 34 is held in this position by the annular ring 64 bearing against the adjacent side of the diaphragm 34. As the timing mechanism 40 unwinds or is rotated in a counter-clockwise direction, the spring 66, aided by the resiliency of the diaphragm 34 in its tendency to return to its normal position, holds the lug 54 against the adjacent face of the cam 46 until, at a predetermined time, the lug 54 is again aligned with the recess 56, whereupon the adjacent faces of the cam sections are urged together, relieving the pressure upon the diaphragm 34, which, aided by the spring means 31, snaps to its normal or dotted line position, thus permitting the valve 30 to seat and close the fuel passageway. During this time, the amount of fuel fed to the burner, not shown, may be regulated manually by the rotation of the knob 38 to align or partially mis-align the aperture 27 with the outlet port 16 without affecting the timing mechanism.

The valve may be manually operated by turning the timing mechanism 40 in a counter-clockwise direction until the point marked M. O. is aligned with the arrow 65, which separates the cam sections 46 and 48 and thus opens the valve 30 in the manner disclosed hereinabove. This action does not actuate the timing mechanism 40, and permits the amount of fuel passing through the passageway to be regulated solely by the manual rotation of the shaft 20 by means of the control member 36.

Obviously the invention is susceptible to some change or alteration without defeating its practicability, and we therefore do not wish to be confined to the preferred embodiment shown in the drawings and described herein, further than we are limited by the scope of the appended claims.

We claim:

1. A time and manually controlled valve, comprising: an elongated tubular member having an inlet end and a lateral outlet port in its wall adjacent to but spaced from said inlet end; a housing rotatably secured to said tubular member opposite its inlet end; a centrally bored shaft rigidly connected to one side of said housing and rotatably carried axially by said tubular member, said shaft having an enlarged counter-bore adjacent each end, the counter-bore in the end of said shaft adjacent said housing communicating with the interior of said housing, the end of said shaft opposite said housing forming a valve seat, said shaft having an aperture in its wall defining the counter-bore adjacent said valve seat for mating and mis-mating with the outlet port in said tubular member when said shaft is rotated; a valve stem slidably carried axially by the bore of said shaft; a valve secured to one end of said valve stem in co-operative relation with said valve seat for opening and closing the adjacent counter-bored end of said shaft; a valve head secured to the end of said valve stem opposite said valve; a snap-action diaphragm disposed within said housing for contacting said valve head when in one position and moving said valve to open position; spring means carried by the counter-bore in said shaft adjacent said housing for normally urging said valve toward a closed position; a control member secured to said housing opposite said shaft and in axial alignment therewith, whereby manual rotation of said control member mates or mis-mates the aperture in said shaft with the outlet port in said tubular member; timing means carried by said control member in spaced-apart relation with said housing; a first cam secured to said timing means and rotatably disposed on said control member; a second cam interposed between said first cam and said housing and axially carried in longitudinally slidable relation by said control member; and sleeve means interposed between said second cam and said housing and axially carried in slidable relation by said control member, a portion of said sleeve means projecting into said housing for contacting said diaphragm and flexing the same toward valve open position upon actuation of said timing means, whereby said timing means and said first and second cams release said sleeve means at a predetermined time for permitting said spring means to move said valve toward a closed position.

2. A time and manually controlled valve, comprising: an elongated tubular member having one inlet end and having an outlet port in its wall; a housing secured to said tubular member opposite its inlet end; a centrally bored shaft rigidly connected to said housing and longitudinally carried by the bore of said tubular member, said shaft having an enlarged counter-bore adjacent each end, the counter-bore in the end of said shaft adjacent said housing communicating with the interior of said housing, said shaft having an aperture in its wall disposed for communication between the counter-bore in the free end of the shaft and the outlet port in said tubular member; a valve stem slidably carried axially by the bore of said shaft; a valve secured to one end of said stem for opening and closing the counter-bored end of said shaft opposite said housing; a valve head secured to the end of said valve stem opposite said valve; a snap-action diaphragm disposed within said housing for contacting said valve head and moving said valve to its open position; spring means carried by the counter-bore in said shaft adjacent said housing for urging said valve toward its closed position; a control member secured to said housing opposite said shaft in axial alignment therewith; timing means carried by said control member in spaced-apart relation with said housing; a first cam secured to said timing means and rotatably disposed on said control member; a second cam interposed between said first cam and said housing, said second cam being slidable longitudinally on said control member; and sleeve means carried by said control member, said first cam being manually rotatable in one direction for moving said second cam and said sleeve means for flexing said diaphragm and moving said valve to its open position when said timing means is started, said first cam being rotatable in the opposite direction by said timing means for releasing said sleeve means and said diaphragm at a predetermined time and permitting said spring means to move said valve toward its closed position.

3. A time and manually controlled valve, comprising: an elongated tubular member having an inlet end and a lateral outlet port in its wall adjacent but spaced from said inlet end; a right circular cylindrical hollow housing rotatably secured axially to said tubular member opposite its inlet end; a centrally bored shaft rigidly connected axially to one side of said housing and rotatably carried axially by said tubular member, said shaft having an enlarged counter-bore adjacent each end, the counter-bore in the end of said shaft adjacent said housing communicating with the interior of said housing, the end of said shaft opposite said housing forming a valve seat, said shaft having an aperture in its wall defining the counter-bore adjacent said valve seat for mating and mis-mating with the outlet port in said tubular member when said shaft is rotated; a valve stem slidably carried axially by the bore of said shaft; a valve secured to one end of said valve stem in co-operative relation with said valve seat for opening and closing the adjacent counter-bored end of said shaft; a valve head secured to the end of said valve stem opposite said valve; a snap-action diaphragm disk disposed within said housing for contacting said valve head when in one position and moving said valve to open position; spring means carried by the counter-bore in said shaft adjacent said housing for normally urging said valve toward a closed position; a control member secured to said housing opposite said shaft and in axial alignment therewith, whereby manual rotation of said control member mates or mis-mates the aperture in said shaft with the outlet port in said tubular member; timing means carried by said control member in spaced-apart relation with said housing; a first cam secured to said timing means and rotatably disposed on said control member; a second cam interposed between said cam and said housing and axially carried in longitudinal slidable relation by said control member; and sleeve means interposed between said second cam and said housing and axially carried in slidable relation by said control member, a portion of said sleeve means projecting into said housing, said first cam being rotatable in one direction with said timing means for moving said second cam and said sleeve means for contacting said diaphragm disk and flexing the same toward valve open position upon actuation of said timing means, said first cam being rotatable in the opposite direction by said timing means for releasing said second cam and said sleeve means at a predetermined time and permitting said spring means to move said valve toward a closed position.

4. A time and manually controlled valve, comprising: an elongated tubular member having one inlet end and having an outlet port in its wall; a right circular cylindrical housing axially secured to said tubular member opposite its inlet end; a centrally bored shaft rigidly connected axially to said housing and longitudinally carried by the bore of said tubular member, said shaft having an enlarged counter-bore adjacent each end, the counter-bore in the end of said shaft adjacent said housing communicating with the interior of said housing, said shaft having an aperture in its wall disposed for communication between the counter-bore in the free end of the shaft and the outlet port in said tubular member; a valve stem slidably carried axially by the bore of said shaft; a valve secured to one end of said stem for opening and closing the counter-bored end of said shaft opposite said housing; a valve head secured to the end of said valve stem opposite said valve; a snap-action diaphragm disk disposed within said housing for contacting said valve head and moving said valve to its open position; spring means carried by the counter-bore in said shaft adjacent said housing for urging said valve toward its closed position; a control member secured to said housing opposite said shaft in axial alignment therewith; timing means carried by said control member in spaced-apart relation with said housing; a first cam secured to said timing means and rotatably disposed on said control member; a second cam interposed between said first cam and said housing, said second cam being slidable longitudinally on said control member; and sleeve means carried by said control member adjacent said second cam and projecting into said housing, said first cam being manually rotatable in one direction for moving said second cam and said sleeve means for flexing said diaphragm and moving said valve to its open position when said timing means is started, whereby said timing means rotates said first cam in the opposite direction to a predetermined position and releases said sleeve means and said diaphragm disk at a predetermined time for permitting said spring means to move said valve toward its closed position.

5. A time and manually controlled fuel valve, comprising: an elongated tubular member having one inlet end and having an outlet port in its wall in spaced relation with said inlet end forming a passageway for fuel;

a right circular cylindrical hollow housing rotatably secured axially to said tubular member opposite its inlet end; a centrally bored shaft rigidly connected axially to the side of said housing adjacent said tubular member and rotatably carried axially by said tubular member, said shaft having an enlarged counter-bore adjacent each end, the counter-bore in the end of said shaft adjacent said housing communicating with the interior of said housing, the end of said shaft opposite said housing forming a valve seat, said shaft having an aperture in its wall defining the counter-bore adjacent said valve seat for mating and mis-mating with the outlet port in said tubular member when said shaft is rotated; a valve stem carried by the bore of said shaft and movable between two extreme positions; a valve secured to one end of said valve stem for seating and unseating on said valve seat to open and close the passageway; a valve head secured to the end of said valve stem opposite said valve; spring means carried by the counter-bore of said shaft adjacent said housing for normally urging said valve toward a closed position; a control member axially secured to said housing opposite said shaft, whereby manual rotation of said control member mates or partially mis-mates the aperture of said shaft with said outlet port in said tubular member for controlling the rate of fuel passing therethrough; timing means carried by said control member in spaced-apart relation with said housing; rotary cam means co-axially carried by said timing means, said cam means interposed between said timing means and said housing; and means connecting said cam means with said valve head, said cam means being rotatable in one direction for moving said valve to open the passageway and rotatable in the opposite direction by said timing means to a predetermined position to permit said spring means to snap said valve to a closed position.

6. Structure as specified in claim 5, in which the means connecting said cam means with said valve head includes a snap-action diaphragm disk disposed within said housing and movable into and out of contact with said valve head by the action of said cam means.

References Cited in the file of this patent

UNITED STATES PATENTS 2,778,419    Wantz  ---------------- Jan. 22, 1957